(12) United States Patent
Afek et al.

(10) Patent No.: US 8,909,813 B2
(45) Date of Patent: Dec. 9, 2014

(54) EFFICIENT PROCESSING OF COMPRESSED COMMUNICATION TRAFFIC

(75) Inventors: Yehuda Afek, Hod Hasharon (IL); Anat Bremler-Barr, Ramat Hasharon (IL); Yaron Koral, Hod Hasharon (IL)

(73) Assignees: Ramot at Tel-Aviv University Ltd., Tel-Aviv (IL); Interdisciplinary Center Herzliya, Herzliya (IL)

( * ) Notice: Subject to any disclaimer, the term of this patent is extended or adjusted under 35 U.S.C. 154(b) by 305 days.

(21) Appl. No.: 13/424,430

(22) Filed: Mar. 20, 2012

(65) Prior Publication Data

US 2012/0243551 A1 Sep. 27, 2012

Related U.S. Application Data

(60) Provisional application No. 61/466,012, filed on Mar. 22, 2011.

(51) Int. Cl.
*G06F 15/16* (2006.01)
*G06F 9/00* (2006.01)
*H04L 29/06* (2006.01)

(52) U.S. Cl.
CPC .................. *H04L 63/1416* (2013.01)
USPC ............................ 709/247; 726/13

(58) Field of Classification Search
USPC .............. 709/247; 710/68; 711/155
See application file for complete search history.

(56) References Cited

U.S. PATENT DOCUMENTS

| | | | | |
|---|---|---|---|---|
| 5,455,577 A | * | 10/1995 | Slivka et al. | 341/51 |
| 6,883,137 B1 | | 4/2005 | Girardot et al. | |
| 7,051,126 B1 | * | 5/2006 | Franklin | 710/68 |
| 7,051,152 B1 | * | 5/2006 | Danilak | 711/100 |
| 7,058,769 B1 | * | 6/2006 | Danilak | 711/155 |
| 7,333,515 B1 | * | 2/2008 | Ramakrishnan et al. | 370/487 |
| 7,624,436 B2 | * | 11/2009 | Balakrishnan et al. | 726/13 |
| 7,784,094 B2 | * | 8/2010 | Balakrishnan et al. | 726/13 |
| 8,397,285 B2 | * | 3/2013 | Balakrishnan et al. | 726/13 |
| 2002/0021838 A1 | | 2/2002 | Richardson et al. | |
| 2003/0145172 A1 | * | 7/2003 | Galbraith et al. | 711/133 |
| 2004/0111439 A1 | * | 6/2004 | Richardson et al. | 707/200 |
| 2004/0190635 A1 | | 9/2004 | Ruehle | |
| 2005/0149888 A1 | | 7/2005 | Gunawardana | |
| 2006/0050968 A1 | * | 3/2006 | Oh et al. | 382/219 |

(Continued)

OTHER PUBLICATIONS

Panigrahy et al., "Reducing TCAM Power Consumption and Increasing Throughput", Proceedings of the 10th Symposium on High Performance Interconnects Hot Interconnects, pp. 107-112, Stanford, USA, Aug. 21-23, 2002.

(Continued)

*Primary Examiner* — Brian P Whipple
*Assistant Examiner* — Michael A Chambers
(74) *Attorney, Agent, or Firm* — D. Kligler I.P. Services Ltd.

(57) ABSTRACT

A method for processing communication traffic includes receiving an incoming stream of compressed data conveyed by a sequence of data packets, each containing a respective portion of the compressed data. The respective portion of the compressed data contained in the first packet is stored in a buffer, having a predefined buffer size. Upon receiving a subsequent packet, at least a part of the compressed data stored in the buffer and the respective portion of the compressed data contained in the subsequent packet are decompressed, thereby providing decompressed data. A most recent part of the decompressed data that is within the buffer size is recompressed and stored in the buffer.

21 Claims, 4 Drawing Sheets

(56) References Cited

U.S. PATENT DOCUMENTS

| | | | |
|---|---|---|---|
| 2006/0139187 A1* | 6/2006 | Helfman et al. | 341/51 |
| 2007/0006293 A1* | 1/2007 | Balakrishnan et al. | 726/13 |
| 2007/0011734 A1* | 1/2007 | Balakrishnan et al. | 726/13 |
| 2008/0046423 A1* | 2/2008 | Khan Alicherry et al. | 707/6 |
| 2009/0103524 A1* | 4/2009 | Mantripragada et al. | 370/352 |
| 2009/0228474 A1* | 9/2009 | Chiu et al. | 707/5 |
| 2010/0088756 A1* | 4/2010 | Balakrishnan et al. | 726/13 |
| 2011/0088069 A1* | 4/2011 | Igarashi | 725/95 |
| 2011/0167030 A1 | 7/2011 | Bremler-Barr et al. | |
| 2011/0185077 A1 | 7/2011 | Bremler-Barr et al. | |

OTHER PUBLICATIONS

Taylor, D., "Survey & Taxonomy of Packet Classification Techniques", May 10, 2004.

Zane et al., "CoolCAMs: Power-Efficient TCAMs for Forwarding Engines", IEEE INFOCOM 2003, San Francisco, USA, Mar. 30-Apr. 3, 2003.

Agrawal et al., "Modeling TCAM Power for Next Generation Network Devices", Proceedings of IEEE International Symposium on Performance Analysis of Systems and Software (ISPASS-2006), Austin, USA, Mar. 19-21, 2006.

Lin et al., "Route Table Partitioning and Load Balancing for Parallel Searching with TCAMs", 2007 IEEE International Parallel and Distributed Processing Symposium, Long Beach, USA, Mar. 26-30, 2007.

Hopcroft, J.E., "An N Log N Algorithm for Minimizing States in a Finite Automation", Stanford University, Jan. 1971.

Yu et al., "Gigabit Rate Packet Pattern-Matching Using TCAM", Proceedings of the 12th IEEE International Conference on Network Protocols (ICNP'04), Berlin, Germany, Oct. 5-8, 2004.

Weinsberg et al., "High Performance String Matching Algorithm for a Network Intrusion Prevention System (NIPS)", High Performance Switching and Routing, pp. 147-153, Poznan, Poland, Jun. 7-9, 2006.

CLAMAV, "Clam AntiVirus 0.96" User Manual, Mar. 31, 2010.

Takeda et al., "Speeding up string pattern matching by text compression. the dawn of a new era", Information Processing Society of Japan Journal, vol. 24, No. 3, pp. 370-384, Mar. 2001.

Bremler-Barr et al., "CompactDFA: Generic State Machine Compression for Scalable Pattern Matching", INFOCOM 2010, pp. 1-9, Mar. 14-19, 2010.

Deutsch P., "Deflate Compressed Data Format Specification version 1.3", Network Working Group, Aladdin Enterprises, May 1996.

Ziv et al., "A Universal Algorithm for Sequential Data Compression", pp. 337-343, vol. IT-23, No. 3, IEEE Transactions on information theory, May 1977.

Aho et al., "Efficient String Matching: An Aid to Bibliographic Search", Programming Techniques, Communications of the ACM, pp. 333-340, vol. 18, No. 6, Jun. 1975.

U.S. Appl. No. 13/013,835 Office Action dated Oct. 29, 2012.

Navarro et al., "A General Practical Approach to Pattern Matching over Ziv-Lempel Compressed Text", Tenth Annual Symposium on Combinatorial Pattern Matching, Warwick University, UK, Jul. 22-24, 1999.

Farach et al., "String Matching in Lempel-Zip Compressed Strings", 27th Annual ACM Symposium on the Theory of Computing, pp. 703-712, Las Vegas, USA, May 29-Jun. 1, 1995.

Kumar et al., "Algorithms to Accelerate Multiple Regular Expressions Matching for Deep Packet Inspection", Proceedings of ACM SIGCOMM'06, Pisa, Italy, Sep. 12-15, 2006.

Wu et al., "A Fast Algorithm for Multi-Pattern Searching", Technical Report TR-94017, Department of Computer Science, University of Arizona, May 1994.

Ruiz-Sanchez et al., "Survey and Taxonomy of IP Address Lookup Algorithms", IEEE Network, Mar./Apr. 2001.

Fisk et al., "Applying Fast String Matching to Intrusion Detection", Technical Report CS2001-0670, year 2002.

Deutsch, P., "Gzip file format specification version 4.3", Network Working Group, RFC 1952, May 1996.

Website Optimization, LLC., "Introduction to Web Site Optimization", Jan. 2007.

Huffman D., "A Method for the Construction of Minimum-Redundancy Codes", Proceedings of IRE, p. 1098-1101, Sep. 1952.

Zlib, "A Massively Spiffy Yet Delicately Unobtrusive Compression Library", Apr. 19, 2010 (www.zlib.net).

Boyer et al., "A fast string searching algorithm", Communications of the ACM, vol. 20, No. 10, pp. 762-772, Oct. 1977.

SNORT Users Manual, Apr. 15, 2008.

Song et al., "A memory efficient multiple pattern matching architecture for network security", INFOCOM 2008, pp. 166-170, Phoenix, USA, Apr. 13-17, 2008.

Van Lunteren, J., "High-performance pattern-matching engine for intrusion detection", INFOCOM 2006, 25th IEEE International Conference on Computer Communications, pp. 1-13, Barcelona, Spain, Apr. 23-29, 2006.

Dimopoulos et al., "A memory efficient reconfigurable aho-corasick fsm implementation for intrusion detection systems", Proceedings of the 2007 International Conference on Embedded Computer Systems: Architectures, Modeling and Simulation (IC-SAMOS 2007), pp. 186-193, Samos, Greece, Jul. 16-19, 2007.

Tuck et al., "Deterministic memory efficient string matching algorithms for intrusion detection", INFOCOM 2004, Hong Kong, China, Mar. 7-11, 2004.

Alicherry et al., "High speed pattern matching for network ids/ips", 14th IEEE International Conference on Network Protocols, pp. 187-196, Santa Barbara, USA, Nov. 12-15, 2006.

Amir et al., "Let sleeping files lie: Pattern matching in z-compressed files", Journal of Computer and System Sciences, vol. 52, issue 2, pp. 299-307, Apr. 1996.

Kida et al., "Shift-and approach to pattern matching in lzw compressed text", 10th Annual Symposium on Combinatorial Pattern Matching, Warwick University, UK, Jul. 22-24, 1999.

Navarro et al., "Boyer-moore string matching over ziv-lempel compressed text", Proceedings of the 11th Annual Symposium on Combinatorial Pattern Matching, pp. 166-180, Montreal, Canada, Jun. 21-23, 2000.

Klein et al., "A new compression method for compressed matching", Proceedings of data compression conference DCC-2000, pp. 400-409, Snowbird, USA, Mar. 28-30, 2000.

Bremler-Barr et al., "Accelerating multi-patterns matching on compressed HTTP Traffic", INFOCOM 2009, Rio de Janeiro, Brazil, Apr. 19-25, 2009.

Manber U., "A text compression scheme that allows fast searching directly in the compressed file", ACM Transactions on Information Systems (TOIS), vol. 15, issue 2, pp. 124-136, Apr. 1997.

Ziviani et al., "Compression: A key for next generation text retrieval systems", IEEE Computer, vol. 33, No. 11, Nov. 2000.

Fisk et al., "Fast Content-Based Packet Handling for Intrusion Detection", UCSD Technical Report CS2001-0670, May 2001.

Ristic, I., "Introducing Mod Security", Nov. 26, 2003.

Cormen et al., "Introduction to Algorithms", second edition, The MIT Press and McGraw-Hill Book Company, 2001.

Hopcroft et al., "Introduction to Automata Theory, Languages, and Computation", Chapter 2, pp. 37-81, second edition, Addison-Wesley, 2001.

Port 80 Software, "Port80 surveys the top 1000 corporations' web servers", years 2002-2007.

Song et al., "IPv6 Lookups using Distributed and Load Balanced Bloom Filters for 100Gbps Core Router Line Cards", INFOCOM 2009, Rio de Janeiro, Brazil, Apr. 19-25, 2009.

Behr, A., "Midrange Firewalls Face Off", Jul. 23, 2004 (http://www.infoworld.com/print/14089).

Fielding et al.., "Hypertext Transfer Protocol—HTTP/1.1", Network Working Group, RFC 2616, Jun. 1999.

Tan et al., "Architectures for Bit-Split String Scanning in Intrusion Detection", IEEE Micro, No. 1, pp. 110-117, Jan.-Feb. 2006.

Liu et al.., "A Fast Pattern-Match Engine for Network Processor-based Network Intrusion Detection System", Proceedings of the International Conference on Information Technology: Coding and Computing, pp. 97-101, Las Vegas, USA, Apr. 5-7, 2004.

Pao et al., "Pipelined Architecture for Multi-String Matching", IEEE Computer Architecture Letters, vol. 7, issue 2, Jul. 2008.

(56) References Cited

OTHER PUBLICATIONS

Lin et al., "Pipelined Parallel AC-based Approach for Multi-String Matching", 14th IEEE International Conference on Parallel and Distributed Systems, Melbourne, Australia, Dec. 8-10, 2008.
Yu et al., "SSA: A Power and Memory Efficient Scheme to Multi-Match Packet Classification", Proceedings of the 2005 ACM symposium on Architecture for networking and communications systems, Princeton, USA, Oct. 26-28, 2005.
Global Technology Associates, Inc., "GB-800 / GB-800e: Small Office Firewalls supporting Mail Sentinel Anti-Spam and Anti-Virus", Data sheet, Feb. 12, 2004.
Sonicwall Inc., "SonicWALL PRO 3060 Getting Started Guide", Jun. 2005.
Stonesoft Corporation, "StoneGate Firewall/VPN", year 2009.
Juniper Networks, Inc., "SRX 5800 Specification", year 2010.
Cisco Systems, Inc., "Cisco ASA 5500 Series Firewall Edition for the Enterprise", years 1992-2006.
Afek et al., "Efficient Processing of Multi-Connection Compressed Web Traffic", Proceedings of the 10th International IFIP TC 6 Conference on Networking, vol. part 1, pp. 52-65, Valencia, Spain, May 9-13, 2011.
Chim et al., "Efficient Phrase-Based Document Similarity for Clustering", IEEE Transactions on Knowledge and Data Engineering, vol. 20, No. 9, pp. 1217-1229, Sep. 2008.
Zamir et al., "Web Document Clustering: A Feasibility Demonstration", Proceedings of the 21st Annual International ACM SIGIR Conference on Research and Development in Information Retrieval, pp. 47-54, Melbourne, Australia, Aug. 24-28, 1998.

\* cited by examiner

```
 1: procedure handleNewPacket(packet,oldPacked)
    Part 1: calculate packet uncompressed size n
 2: for all symbols in packet do
 3:     S ← next symbol in packet after Huffman decode
 4:     packetAfterHuffmanDecode ← S
 5:     if S is literal then
 6:         n ← n + 1
 7:     else                                          ▷ S is Pointer
 8:         n ← n + pointer length
 9:     end if
10: end for
    Part 2: decode oldPacked part which is out of boundary
11: while less than n literals were unpacked do
12:     S ← next symbol in oldPacked after Huffman decode
13:     if S is literal then
14:         store literal in unPacked buffer
15:     else                                          ▷ S is Pointer
16:         store pointer's referred literals in unPacked buffer
17:     end if
18: end while
    Part 3: decode oldPacked part within boundary
19: if boundary falls within a pointer in oldPacked then
20:     copy to newPacked only the suffix of the referred literals
21: end if
22: for all symbols in oldPacked do
23:     S ← next symbol in oldPacked after Huffman decode
24:     if S is literal then
25:         add symbol to unPacked and newPacked buffers
26:     else                                          ▷ S is Pointer
27:         store the referred literals in unPacked
28:         if pointer is out of the boundary then
29:             store the coded referred literals in newPacked
30:         else
31:             store the coded pointer in newPacked
32:         end if
33:     end if
34: end for
    Part 4: decode packet
35: for all symbols in packetAfterHuffmanDecode do
36:     S ← next symbol in packetAfterHuffmanDecode
37:     This part is the same as Lines [24-33]
38: end for
```

FIG. 4

EFFICIENT PROCESSING OF COMPRESSED COMMUNICATION TRAFFIC

CROSS-REFERENCE TO RELATED APPLICATIONS

This application claims the benefit of U.S. Provisional Patent Application 61/466,012, filed Mar. 22, 2011, which is incorporated herein by reference.

FIELD OF THE INVENTION

The present invention relates generally to processing of data transmitted over communication networks, and specifically to compression, decompression and pattern matching in such data.

BACKGROUND

A wide variety of methods for data compression are known in the art. Many Web servers, for example, use the GZIP algorithm to compress Hypertext Transfer Protocol (HTTP) symbol streams that they transmit. GZIP is defined in Request for Comments (RFC) 1951 of the Internet Engineering Task Force (IETF), by Deutsch, entitled, "Deflate Compressed Data Format Specification" (1996), which is incorporated herein by reference. GZIP initially compresses the symbol stream using the LZ77 algorithm, as defined by Ziv and Lempel in "A Universal Algorithm for Sequential Data Compression," IEEE Transactions on Information Theory (1977), pages 337-343, which is incorporated herein by reference. LZ77 operates generally by replacing recurring strings of symbols with pointers to previous data within a 32 KB window. As the next stage in GZIP, the output of the LZ77 compression operation is further compressed by Huffman encoding, as is known in the art. The compressed HTTP stream is decompressed at the destination by Huffman decoding followed by LZ77 decompression.

Pattern matching algorithms are widely used in a variety of network communication applications. For example, Intrusion Detection Systems (IDS) use pattern matching in deep packet inspection (DPI). The packet content is typically checked against multiple patterns simultaneously for purposes such as detecting known signatures of malicious content.

The most common approach used at present in this type of multi-pattern matching is the Aho-Corasick algorithm, which was first described by Aho and Corasick in "Efficient String Matching: An Aid to Bibliographic Search," *Communications of the ACM* 6, pages 333-340 (1975), which is incorporated herein by reference. (The term "multi-pattern matching," as used in the context of the present patent application and in the claims, refers to scanning a sequence of symbols for multiple patterns simultaneously in a single process.) Efficient methods for multi-pattern matching in compressed data are described, for example, in U.S. Patent Application Publication 2011/0185077, whose disclosure is incorporated herein by reference.

SUMMARY

Embodiments of the present invention that are described hereinbelow provide improved methods and apparatus for handling of compressed data.

There is therefore provided, in accordance with an embodiment of the invention, a method for processing communication traffic, which includes receiving an incoming stream of compressed data conveyed by a sequence of data packets. The sequence includes a first packet and one or more subsequent packets. Each packet in the sequence contains a respective portion of the compressed data. The respective portion of the compressed data contained in the first packet is stored in a buffer, having a predefined buffer size. Upon receiving a subsequent packet, at least a part of the compressed data stored in the buffer and the respective portion of the compressed data contained in the subsequent packet are decompressed, thereby providing decompressed data. A most recent part of the decompressed data that is within the buffer size is recompressed, and the recompressed data are stored in the buffer.

In disclosed embodiments, the compressed data include compression metadata, and recompressing the most recent part includes applying the compression metadata received in the data packets in recompressing the decompressed data. Typically, the compression metadata include pointers to previous data in the incoming stream that are outside the predefined buffer size, and recompressing the most recent part may include modifying the data so that the pointers point only to the previous data within the predefined buffer size.

In a disclosed embodiment, the data in the incoming stream are compressed in accordance with a GZIP algorithm, and the data packets are transmitted using a Hypertext Transfer Protocol (HTTP). Typically, receiving the incoming stream includes applying Huffman decoding to the data packets in order to recover the incoming stream, which includes a symbol stream that is compressed in accordance with a LZ77 algorithm.

In some embodiments, the method includes processing the data by applying multi-pattern matching to identify specified patterns in the incoming stream. Applying the multi-pattern matching may include identifying the patterns occurring in the stream while using compression metadata in the incoming stream to skip over parts of the incoming stream. In one embodiment, recompressing the most recent part of the decompressed data includes storing in the buffer, together with the recompressed data, status indicators that are generated and used in the multi-pattern matching.

Typically, the method is carried out concurrently over multiple incoming streams including respective sequences of the data packets.

There is also provided, in accordance with an embodiment of the invention, apparatus for processing communication traffic, which includes an incoming stream of compressed data conveyed by a sequence of data packets. A memory is configured to serve as a buffer, which has a predefined buffer size and is configured to receive the respective portion of the compressed data contained in a first packet. Processing circuitry is configured, upon receiving a subsequent packet, to decompress at least a part of the compressed data stored in the buffer and the respective portion of the compressed data contained in the subsequent packet, thereby providing decompressed data, and to recompress a most recent part of the decompressed data that is within the buffer size, and to store the recompressed data in the buffer. The present invention will be more fully understood from the following detailed description of the embodiments thereof, taken together with the drawings in which:

BRIEF DESCRIPTION OF THE DRAWINGS

FIG. 4 is a pseudocode listing of a method for buffering packet data, in accordance with an embodiment of the present invention.

DETAILED DESCRIPTION OF EMBODIMENTS

Overview

In DPI systems that are known in the art, processing LZ77-compressed Web traffic generally requires that the system maintain a 32 KB buffer of uncompressed data in order to process subsequent pointers in the compressed stream. For large-scale systems, which process tens or hundreds of thousands of concurrent communication sessions, each with its own compressed data stream, a very large main memory is needed to meet this buffering requirement.

Embodiments of the present invention address this issue by maintaining the individual session buffers in a compressed form. As each new packet is received in a given session, the corresponding session buffer is decompressed in order to decode the pointers in the compressed data in the new packet. After the new packet data have been decompressed and processed, the most recent part of the session data (up to the specified buffer size, such as 32 KB) is recompressed and stored until the next packet arrives. The inventors have found that this approach reduces the memory requirements for session buffering by a factor of five, while adding only a small additional computational burden for the repeated compression and decompression.

In a disclosed embodiment, the decompressed data are recompressed using compression metadata from the incoming data stream. (The term "compression metadata," as used in the context of the present patent application and in the claims, means pointers in the compressed data stream that were not present in the original, uncompressed data, but rather reference other data for the purpose of compression.) This sort of recompression, using the metadata from the incoming stream, is also referred to in the present patent application as "packing." It is advantageous in reducing the computational burden that is associated with recompression of the buffered data. Pointers that refer to previous data outside the current 32 KB buffer window are replaced with the corresponding literals before recompression. Thus, the pointers point only to the previous data within the predefined buffer size when the data are recompressed.

The techniques described above are useful particularly in conjunction with multi-pattern matching over the data. Specifically, the methods described in the above-mentioned U.S. Patent Application Publication 2011/0185077 may be adapted to operate more efficiently in conjunction with the present buffer compression and decompression techniques.

System Description

Figure 1:
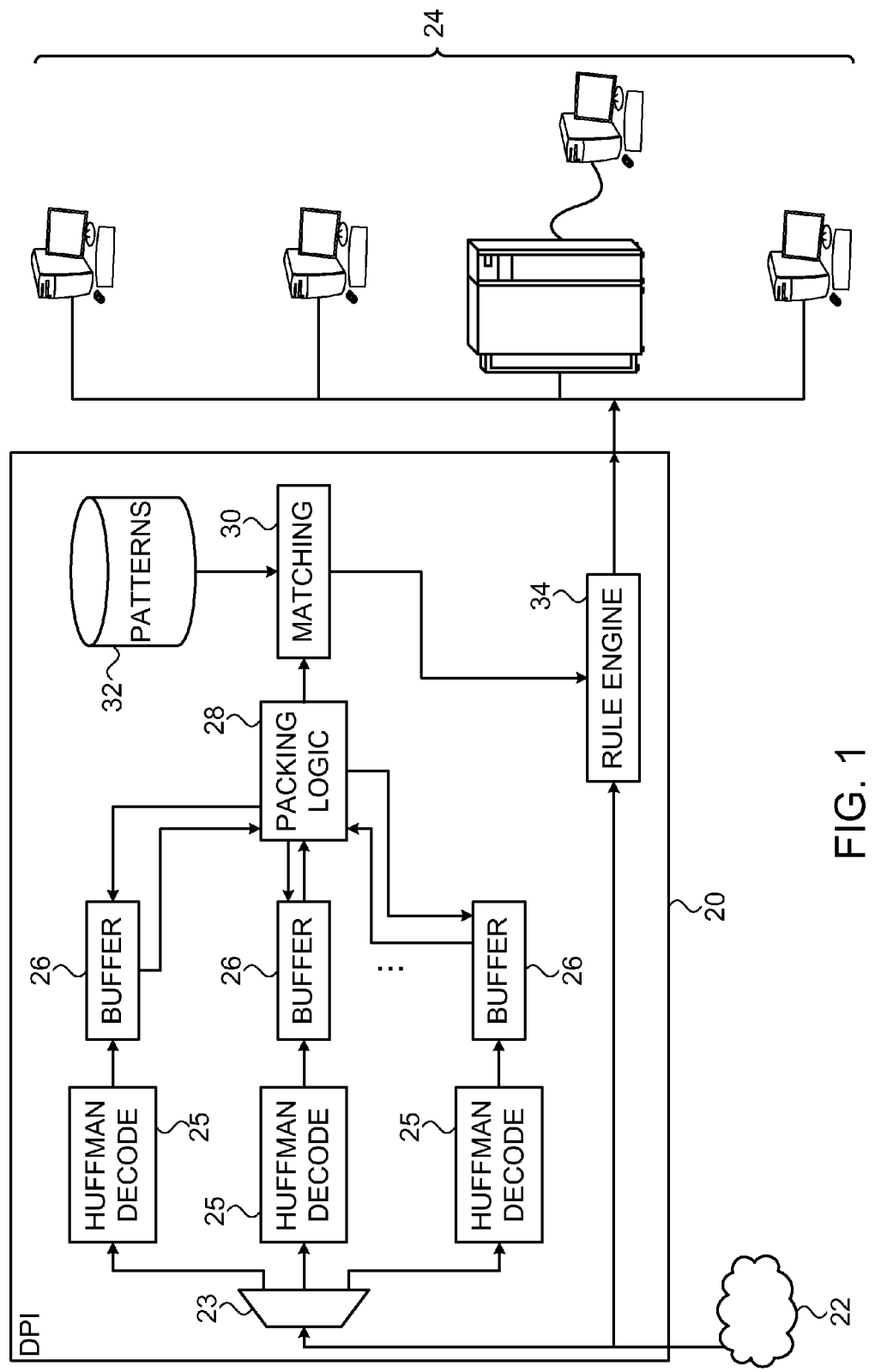
FIG. 1 is a block diagram that schematically illustrates apparatus for deep packet inspection (DPI), in accordance with an embodiment of the present invention.

FIG. 1 is a block diagram that schematically illustrates apparatus 20 for deep packet inspection (DPI), in accordance with an embodiment of the present invention. This apparatus implements the methods of buffering of compressed data and of multi-pattern matching that are explained above, and which are described in greater detail hereinbelow. Apparatus 20 may serve, for example, as an intrusion detection system (IDS), which inspects and filters packets transmitted from a public network 22 to a private network 24. In this capacity, the apparatus checks incoming data packets based on a predefined set of patterns, and decides on the disposition of packets depending upon whether the sequences of symbols (typically bytes) that they contain match any of the patterns. It is assumed in this example, for the sake of simplicity, that the incoming data packets to apparatus 20 contain compressed HTTP traffic, and the apparatus likewise outputs compressed HTTP traffic to destination computers in network 24; but other types of compressed traffic may be handled in a similar fashion.

As noted earlier, HTTP traffic is commonly compressed using the GZIP algorithm, which applies LZ77 text compression followed by Huffman encoding. LZ77 compresses a series of symbols (which in the context of HTTP may equivalently be referred to as "bytes" or "characters") by searching for previous occurrences of each string in the series within a sliding window that contains the last 32 KB of uncompressed data. Each repeated occurrence of a given string is replaced with a pointer, in the form of a pair (distance,length), wherein distance is a number between 1 and 32,768 indicating the distance in bytes to the previous occurrence of the string, and length is a number between 3 and 258 that indicates the length of the referenced string in bytes. For example, the string: 'abcdefabcd', can be compressed to: 'abcdef(6,4)', wherein (6,4) indicates that the decoder should return six bytes and copy four bytes from that point.

Huffman coding codes each symbol to a variable-size codeword. The more frequent the symbol, the shorter is its corresponding codeword. In GZIP, Huffman coding replaces both ASCII characters (also referred to as "literals") and pointers with codewords using two dictionaries, one for the literals and pointer lengths and the other for the pointer distances. The Huffman dictionaries for the two alphabets appear in the block immediately after the HTTP header bits and before the actual compressed data. Huffman coding may use dynamic dictionaries for better compression, meaning that different HTTP sessions can have different dictionaries.

Upon receiving packets from network 22 containing compressed HTTP data, a demultiplexer 23 separates the incoming packets into multiple streams, and the data in each stream are directed to a Huffman decoder 25 in apparatus 20, which removes the HTTP header and stores the Huffman dictionaries for the session in question. Decoder 25 uses the dictionaries to convert the stream of Huffman codes into the corresponding symbols of the compressed LZ77 data stream.

The output of Huffman decoder 25 is directed to a corresponding buffer 26. Typically, buffers 26 comprise corresponding segments within a main memory of apparatus 20. A "stream" of packets in this context may be identified, for example, as a sequence of packets belonging to the same TCP connection or HTTP session. The data are stored in buffers 26 in compressed form, and are periodically decompressed and then recompressed by processing circuitry, referred to as packing logic 28, as described in detail hereinbelow. Generally, to conserve memory, packing logic 28 keeps buffers 26 in compressed form, and decompresses any given buffer only when a new packet arrives in the corresponding stream. When processing of the new packet is done, packing logic 28 recompresses the buffer. Apparatus 20 thus maintains multiple buffers 26 and processes multiple incoming streams concurrently, while holding the overall amount of memory used at any given time to a near-minimal volume relative to the actual amount of incoming data that it processes.

As new packets arrive, packing logic 28 processes and passes the data that they contain to a matching processor 30, which applies multi-pattern matching to the data streams based on a specified set of patterns that is stored in a memory 32. The patterns may be stored in the form of an Aho-Corasick deterministic finite automaton (DFA), as described in the Background section above and explained in greater detail in the above-mentioned U.S. Patent Application Publication 2011/0185077. Additionally or alternatively, the DFA itself may be organized and stored in a compact form (separate and apart from the compression of the data stream that it processes), and processor 30 may apply this compact DFA to the literals in the compressed symbol stream, as described in U.S. Patent Application Publication 2011/0167030, whose disclosure is incorporated herein by reference.

The patterns in memory 32 may be associated with corresponding actions, such as blocking and/or reporting packets containing certain patterns. Upon discovering a pattern in the compressed data, processor 30 instructs a rule engine 34 to take the appropriate action. (Although rule engine 34 is shown as a separate functional block from matching processor 30, in practice the functions of the rule engine may also be carried out by processor 30.) The rule engine permits packets that are not blocked to be transmitted onward to network 24, with the HTTP payloads still in their original, compressed form.

Alternatively, the patterns stored in memory 32 may have different forms, and processor 30 may apply other sorts of algorithms, as are known in the art, to the literals in the compressed data stream. For example, the patterns may have the form of regular expressions, rather than fixed strings. As another example, instead of the Aho-Corasick algorithm, the methods described below may be adapted to operate in conjunction with a shift-based pattern matching algorithm, such as a modified Wu-Manber (MWM) algorithm, as described in the above-mentioned U.S. Patent Application Publication 2011/0185077.

The logical functions performed by apparatus 20 (including the decision and control functions of packing logic 28, processor 30, and rule engine 34) are typically carried out by suitable digital logic circuits, which may comprise hard-wired and/or programmable logic components. Alternatively or additionally, at least some of these functions may be implemented in software executed by a general-purpose computer processor with suitable interfaces. This software may be downloaded to the processor in electronic form, over a network, for example. Alternatively or additionally, the software may be stored on tangible, non-transitory computer-readable media, such as optical, magnetic, or electronic memory.

Although FIG. 1 relates specifically to processing of compressed HTTP traffic in the context of an intrusion detection system, the principles of the present invention may similarly be applied to other types of compressed data and may be implemented not only in gateways like apparatus 20, but also in servers, host computers, and other processing nodes.

Buffer Packing Techniques

Figure 2:
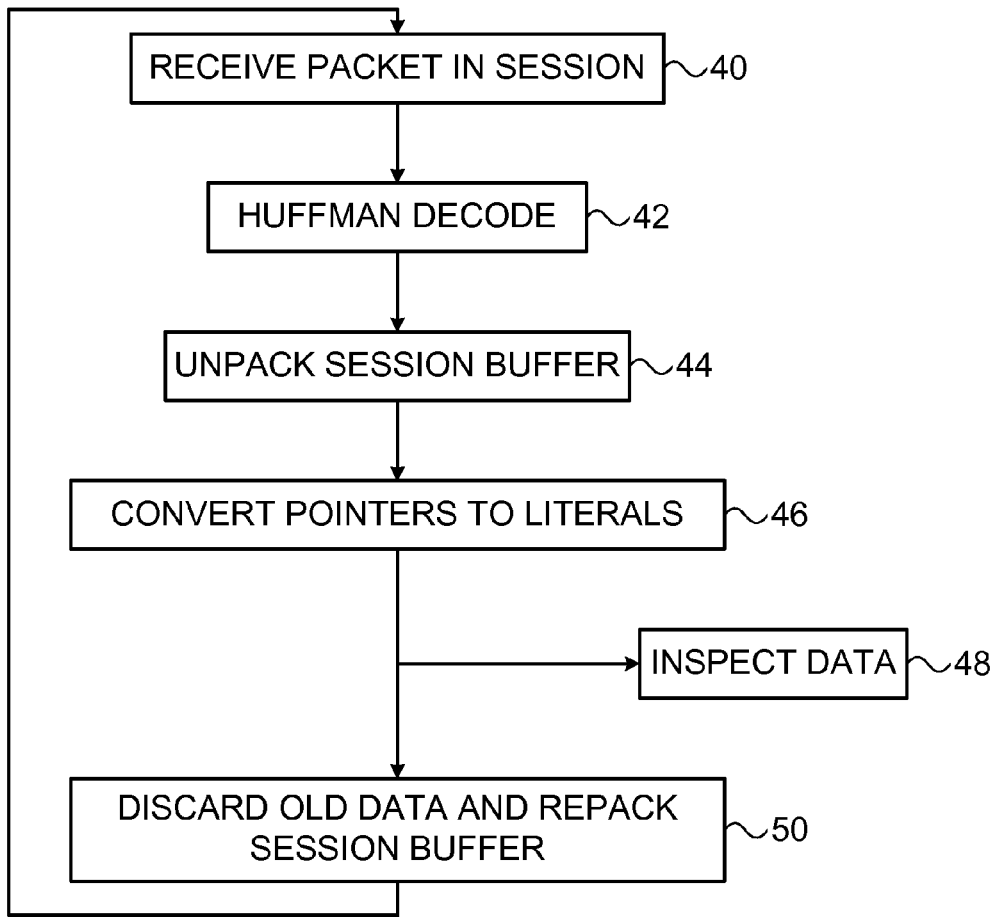
FIG. 2 is a flow chart that schematically illustrates a method for processing compressed data, in accordance with an embodiment of the present invention.

FIG. 2 is a flow chart that schematically illustrates a method for processing compressed data, in accordance with an embodiment of the present invention. This method is described, for the sake of convenience, with reference to the elements and functions of apparatus 20, but it may alternatively be implemented in other settings in which large quantities of compressed data are received and buffered.

The method of FIG. 2 is initiated whenever a data packet is received from network 22, at a packet input step 40. Apparatus 20 reads the packet header and uses the header data in identifying the session (or equivalently, the stream) to which the packet belongs. Huffman decoder 23 decodes the packet payload, at a decoding step 42, and outputs the corresponding compressed LZ77 data stream. Demultiplexer 25 directs this stream to the appropriate buffer 26.

Figure 3A:
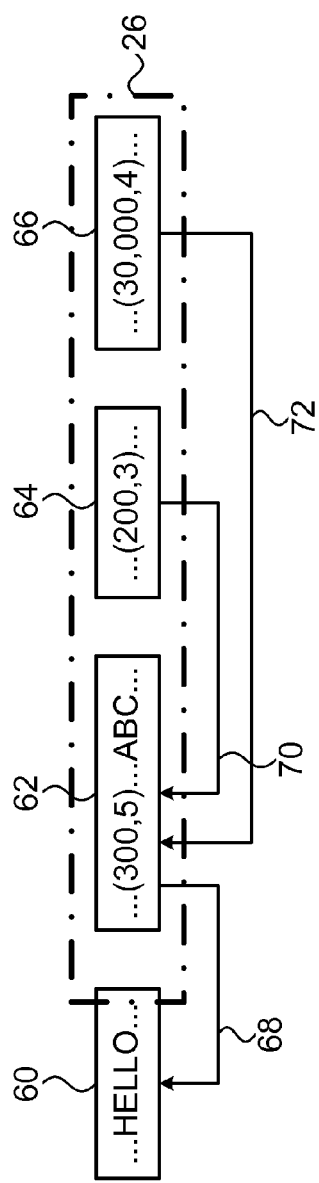
FIGS. 3A-3C are diagrams that schematically illustrate stages in a process of buffering packets of compressed data, in accordance with an embodiment of the present invention.
Figure 3B:
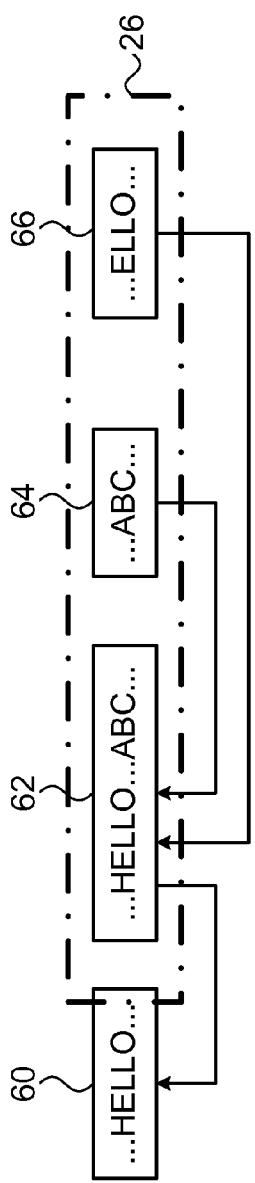
Figure 3C:
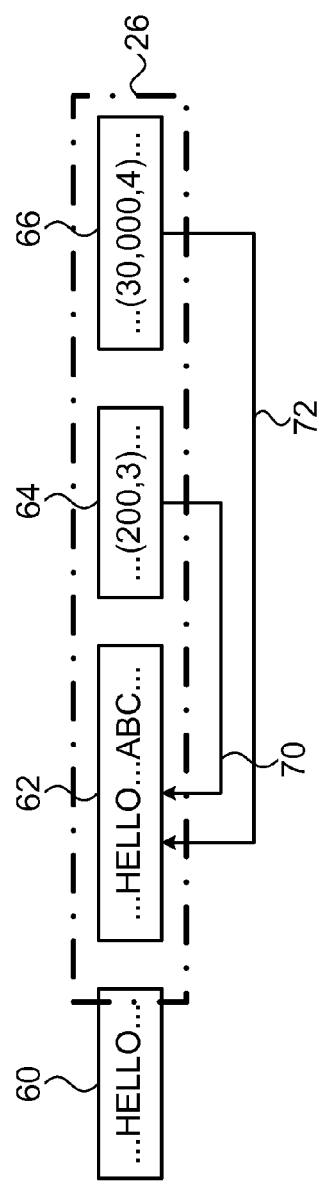

FIGS. 3A-3C schematically illustrate stages in a process of buffering packets 60, 62, 64, 66, . . . , of compressed data in a given stream, in accordance with an embodiment of the present invention. Packets 60, 62 and are assumed to be held in buffer 26, in compressed form, when new packet 66 arrives, as shown in FIG. 3A. The compressed data in each new packet typically include pointers 68, 70, 72, . . . , to previous locations in the stream to which the new packet belongs. These pointers may point to literals (such as pointers 68 and 70), or to other pointers (such as pointer 72). FIG. 3B shows the buffer contents in uncompressed form, and FIG. 3C shows how the buffer contents are recompressed, as explained below.

Upon receiving a new packet in a given stream, packing logic 28 decompresses the corresponding buffer 26, at an unpacking step 44 (FIG. 2). As the buffer size is limited, packet 60 will be swapped out of the buffer to make room for the contents of packet 66. Pointer 68, however, points to a literal in packet 60 and will lose its meaning when packet 60 is swapped out. To solve this problem, packing logic 28 identifies any pointers in packets 62, 64 and 66 that point to locations that will be beyond the buffer boundary when packet 60 is swapped out, and replaces these pointers with the corresponding literals, at a pointer conversion step 46. Thus, in the example shown in FIG. 3C, pointer 68 is replaced by the literal "hello".

This process of pointer swapping can be carried out by decompressing the entire buffer, as shown in FIG. 3B, and then recompressing the packets that are to remain in the buffer, using LZ77, for example. This approach is costly, however, in terms of computation; and the inventors have found it preferable to replace only the pointers (such as pointer 68) that will point beyond the buffer boundary, while leaving the remaining pointers (such as pointers 70 and 72) in the buffer untouched. This latter solution uses slightly more buffer memory but considerably less computing power.

Packing logic 28 passes the data from buffer 26 to processor 30 for pattern matching, at a data inspection step 48. Standard GZIP decompression may be used to decompress the data for this purpose, yielding the decompressed data stream of FIG. 3B. Alternatively, if processor 30 is able to operate on compressed data, as explained in the above-mentioned U.S. Patent Application Publication 2011/0185077, for example, packing logic 28 can simply pass the compressed data along to processor 30 for pattern matching, in which case packing logic 28 may skip over the stage of FIG. 3B. Further alternatively, to avoid repeated decompression of the entire buffer, the buffer may be decompressed in "chunks," using indices to hold the starting positions of the chunks, as described in the above-mentioned U.S. Provisional Patent Application 61/466,012. The inventors have found that this approach reduces the computing power required for buffer decompression when matching processor 30 operates on decompressed data.

After replacing the out-of-boundary pointers with the corresponding literals, packing logic 28 discards the old data that extend beyond the boundary of buffer 26 (such as packet 60 in the example of FIG. 3C), and then recompresses and stores the remaining data in buffer 26, at a buffer packing step 50. The process of FIG. 2 is then repeated when the next packet arrives in the given stream. Logic 28 may be configured to process many concurrent streams in this fashion.

FIG. 4 is a pseudocode listing of a method for buffering packet data, in accordance with an embodiment of the present invention. In this listing, the following terms are use:
    packet—input packet.
    oldPacked—the old packed buffer received as input. Every cell is either a literal or a pointer.
    newPacked—the new packed buffer.
    unPacked—temporary array of 32K uncompressed literals.
    packetAfterHuffmanDecode—contains the Huffman decoded symbols of the input packet.

The algorithm shown in FIG. 4 has four parts. The first part performs Huffman decoding of the incoming packet in order to determine its uncompressed size, which in turn determines the new boundary of the 32 KB buffer. Pointers cannot be extracted at this point since oldPacked is still compressed. Therefore the decoding is kept within a linked-list data structure, which generally contains a sequence of literals and pointer elements. The other three parts of the algorithm decode either oldPackedor packet into newPacked using unPacked. Part 2 decodes data that will not be packed again since it is located outside of the new boundary of the 32 KB buffer (after receiving the new packet). Parts 3 and 4 decode the rest of oldPacked and packet respectively, and prepare the newPacked buffer following the decoding process.

As noted earlier, processor 30 may advantageously apply multi-pattern matching to the LZ77-compressed data in buffers 26, using the method described in U.S. Patent Application Publication 2011/0185077. This method takes advantage of pointer information from LZ77 in order to skip over and thus avoid scanning some bytes in the incoming data stream. Data regarding previous byte scans are stored in a Status Vector, in which each entry is two bits long and stores three possible state values: Match, Check, and Uncheck. This method of multi-pattern matching is largely independent of and separate from the methods of buffer packing that are described above, but there are two points that should be considered in combining these methods:

1) Buffer storage is also required (typically 8 KB) for the Status Vector.
2) The Status Vector should take into account the changes that the present buffer packing algorithm makes in some of the compression pointers.

The points can be addressed by storing status indicators within buffer 26 to mark state value changes of the Status Vector, and then by using the pointers in buffer 26 to determine the actual state values during multi-pattern matching. The state value changes (rather than the state values themselves) are stored among the packed buffer symbols. There is no need to store state value changes within pointers, since the multi-pattern matching algorithm can restore most of the state values on the basis of the pointer references. The state values that cannot be restored in this way can be maintained using extra bits in buffer 26 to indicate the state values. Whenever packing logic 28 replaces a pointer with literals, the symbols that represent state values are reproduced at the same time, and will thus remain valid. Thus, no additional memory references are required for state value updates after pointer replacement.

Combining the present methods of buffer packing with the methods for pattern matching in compressed data that are described in U.S. Patent Application Publication 2011/0185077 achieves large savings in terms of both computational resources and memory by comparison with methods known in the art. For example, in experimental comparisons of these methods with standard (uncompressed) buffering and Aho-Corasick pattern matching, the inventors have found their methods to operate at twice the speed, while requiring only one fifth the amount of memory consumed by the standard methods.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing deep packet inspection (DPI) of communication traffic, comprising:
    managing for a plurality of packet streams of data, buffers which store a recent portion of the data of the stream in a compressed form;
    receiving a packet of an incoming stream of compressed data;
    decompressing at least a part of the compressed data stored in the buffer of the incoming stream;
    decompressing the compressed data contained in the received packet, using the decompressed part of the compressed data stored in the buffer;
    scanning the decompressed data of the received packet;
    recompressing a most recent part of the decompressed data from within the buffer, together with the decompressed data from the received packet; and
    storing the recompressed data in the buffer of the incoming stream.

2. The method according to claim 1, wherein the compressed data comprise compression metadata, and wherein recompressing the most recent part comprises applying the compression metadata received in the data packets in recompressing the decompressed data.

3. The method according to claim 1, wherein recompressing the most recent part comprises using the contents of the buffer from before receiving the packet, while replacing pointers that point to data not returned to the buffer, with corresponding literals.

4. The method according to claim 1, wherein the data in the incoming stream are compressed in accordance with a GZIP algorithm.

5. The method according to claim 4, wherein the data packets are transmitted using a Hypertext Transfer Protocol (HTTP).

6. The method according to claim 4, wherein receiving the incoming stream comprises applying Huffman decoding to the data packets in order to recover the incoming stream, which comprises a symbol stream that is compressed in accordance with a Lempel-Ziv compression (LZ77) algorithm.

7. The method according to claim 1, wherein scanning the decompressed data comprises processing the data by applying multi-pattern matching to identify specified patterns in the incoming stream.

8. The method according to claim 7, wherein applying the multi-pattern matching comprises identifying the patterns occurring in the stream while using compression metadata in the incoming stream to skip over parts of the incoming stream.

9. The method according to claim 7, wherein recompressing the most recent part of the decompressed data comprises storing in the buffer, together with the recompressed data, status indicators that are generated and used in the multi-pattern matching.

10. The method according to claim 1, wherein the method is carried out concurrently over multiple incoming streams comprising respective sequences of the data packets.

11. Apparatus for deep packet inspection (DPI) of communication traffic, which includes an incoming stream of compressed data conveyed by a sequence of data packets, the sequence including a first packet and one or more subsequent packets, each packet in the sequence containing a respective portion of the compressed data, the apparatus comprising:
- a memory configured to for a plurality of packet streams of data, buffers which store a recent portion of the data of the stream in a compressed form; and
- processing circuitry, which is configured, upon receiving a packet of an incoming stream of compressed data, to decompress at least a part of the compressed data stored in the buffer of the incoming stream, to decompress the compressed data contained in the received packet, using the decompressed part of the compressed data stored in the buffer, to scan the decompressed data of the received packet, to recompress a most recent part of the decompressed data from within the buffer, and to store the recompressed data in the buffer of the incoming stream.

12. The apparatus according to claim 11, wherein the compressed data comprise compression metadata, and wherein the processing circuitry is configured to use the compression metadata received in the data packets in recompressing the decompressed data.

13. The apparatus according to claim 11, wherein the processing circuitry is configured to use the contents of the buffer from before receiving the packet, while replacing pointers that point to data not returned to the buffer, with corresponding literals.

14. The apparatus according to claim 11, wherein the data in the incoming stream are compressed in accordance with a GZIP algorithm.

15. The apparatus according to claim 14, wherein the data packets are transmitted using a Hypertext Transfer Protocol (HTTP).

16. The apparatus according to claim 14, wherein the processing circuitry is configured to apply Huffman decoding to the data packets in order to recover the incoming stream, which comprises a symbol stream that is compressed in accordance with a Lempel-Ziv compression (LZ77) algorithm.

17. The apparatus according to claim 11, wherein the processing circuitry is configured to apply multi-pattern matching to the data so as to identify specified patterns in the incoming stream, in scanning the decompressed data.

18. The apparatus according to claim 17, wherein the processing circuitry is configured to identify the patterns occurring in the stream while using compression metadata in the incoming stream to skip over parts of the incoming stream.

19. The apparatus according to claim 17, wherein the processing circuitry is configured to store in the buffer, together with the recompressed data, status indicators that are generated and used in the multi-pattern matching.

20. The apparatus according to claim 11, wherein the processing circuitry is configured to decompress and recompress the data concurrently over multiple incoming streams comprising respective sequences of the data packets.

21. The method according to claim 1, wherein recompressing a most recent part of the decompressed data comprises recompressing a portion of data required for decompression of subsequently received packets.

* * * * *